United States Patent
Liaw et al.

(10) Patent No.: US 7,392,967 B2
(45) Date of Patent: Jul. 1, 2008

(54) CLAMP FOR BICYCLE SEAT POST

(75) Inventors: Suh Jang Liaw, Taichung (TW); Di Shun Liao, Taichung (TW)

(73) Assignee: Shih Sanyo Enterprise Co., Ltd., Taichung (TW)

( * ) Notice: Subject to any disclaimer, the term of this patent is extended or adjusted under 35 U.S.C. 154(b) by 273 days.

(21) Appl. No.: 11/402,373

(22) Filed: Apr. 7, 2006

(65) Prior Publication Data

US 2007/0235607 A1    Oct. 11, 2007

(51) Int. Cl.
A47G 96/06 (2006.01)
A47G 29/00 (2006.01)
A47K 1/00 (2006.01)
E04G 5/06 (2006.01)

(52) U.S. Cl. ............... 248/218.4; 248/188.1; 248/74.3

(58) Field of Classification Search ............... 248/74.3, 248/218.4, 188.1; 297/195.1, 215.13
See application file for complete search history.

(56) References Cited

U.S. PATENT DOCUMENTS

| 6,431,423 | B1 * | 8/2002 | Allen et al. .................. 224/509 |
| 6,807,714 | B2 * | 10/2004 | O'Young et al. .......... 24/16 PB |
| 2002/0185581 | A1 * | 12/2002 | Trask .......................... 248/408 |

* cited by examiner

*Primary Examiner*—Amy J. Sterling

(57) ABSTRACT

A clamp in one embodiment includes a flexible base; a bifurcation pivotal about one end of the base; a fastening member pivotal about the other end of the base and including pawls, an opposite projection, and a toothed section formed above; a universal member meshed with the toothed section; a seat rotatably secured to the universal member and adapted to releasably secure to a light; and a flexible ratchet pivotal about the other end of the base. Wrapping the ratchet around a seat post of bicycle by inserting it through the bifurcation and a space between the pawls and one end of the ratchet, pivoting the fastening member toward the seat until one pawl engages the ratchet and the fastening member presses on the base to urge against the seat post, and pivoting the bifurcation to press the bar onto the projection will fasten the seat post.

4 Claims, 10 Drawing Sheets

CLAMP FOR BICYCLE SEAT POST

BACKGROUND OF THE INVENTION

1. Field of Invention

The present invention relates to clamping devices and more particularly to an improved clamp for a seat post of bicycle.

2. Related Art

A conventional clamp for bicycle is shown in FIG. 1. The clamp comprises a body 81, a slot 83, a flexible member having a ratchet section 82 tightly wrapped around a seat post 91 and passed the slot 83, and a pawl 84 formed in the slot 83 and adapted to catch and hold one of the teeth of the ratchet section 82.

However, the prior clamp suffered from a couple of disadvantages. For example, the fastening is not reliable (i.e., not durable). Further, unfastening of the clamp is not easy. Thus, the need for improvement still exists.

SUMMARY OF THE INVENTION

It is therefore an object of the present invention to provide a clamp comprising a flexible base comprising a first pivot at one end, a second pivot at the other end, a third pivot below the second pivot, and a staged tunnel through its center; a urging member comprising a neck securely fitted in the tunnel, and a urging surface; a bifurcation pivotably secured to the first pivot and comprising two arms and a bar interconnected the arms thereof; a fastening member having the other end pivotably secured to the second pivot and comprising a series of pawls at the other end, a transverse projection at one end, a urging section interconnected the pawls and the projection, a tunnel member projected from the urging section and being perpendicular thereto, and a toothed section formed on the tunnel member; a universal member comprising a hollow cylinder secured to the fastening member, a gear formed at the other end of the cylinder and meshed with the toothed section, and a disc projected from an outer surface of the cylinder, the disc including a hollow center having a plurality of cavities formed around; a seat comprising a U-shaped member formed on one surface with the disc being fastened therein, an elliptic member formed in the U-shaped member and adapted to fit between any two opposite ones of the cavities, and a mounting member formed on the other opposite surface and adapted to releasably secure to a light; and an elongate flexible member having one end pivotably secured to the third pivot and comprising a loop and a ratchet section having a series of teeth extended from a portion proximate the loop to the other open end; whereby wrapping the flexible member around a seat post of a bicycle by inserting the flexible member through a space between the bar and the first pivot, a space between the second and third pivots, and the loop, pivoting the fastening member toward the seat until one of the pawls catches and holds one of the teeth of the ratchet section and the urging section presses on the base to urge the urging surface against the seat post, and pivoting the bifurcation to press the bar onto the projection will fasten the clamp onto the seat post.

It is another object of the present invention to provide a clamp comprising a flexible base comprising a first pivot at one end, a second pivot at the other end, a third pivot below the second pivot, and a staged tunnel through its center; a urging member comprising a neck securely fitted in the tunnel, and a urging surface; a bifurcation pivotably secured to the first pivot and comprising two arms and a bar interconnected the arms thereof; a fastening member having the other end pivotably secured to the second pivot and comprising a series of protuberances at the other end, a transverse projection at one end, a urging section interconnected the protuberances and the projection, a tunnel member projected from the urging section and being perpendicular thereto, and a toothed section formed on the tunnel member; a universal member comprising a hollow cylinder secured to the fastening member, a gear formed at the other end of the cylinder and meshed with the toothed section, and a disc projected from an outer surface of the cylinder, the disc including a hollow center having a plurality of cavities formed around; a seat comprising a U-shaped member formed on one surface with the disc being fastened therein, an elliptic member formed in the U-shaped member and adapted to fit between any two opposite ones of the cavities, and a mounting member formed on the other opposite surface and adapted to releasably secure to a light; and an elongate flexible member having one end pivotably secured to the third pivot and comprising a loop and a holed section having a series of holes extended from a portion proximate the loop to the other open end; whereby wrapping the flexible member around a seat post of a bicycle by inserting the flexible member through a space between the bar and the first pivot, a space between the second and third pivots, and the loop, pivoting the fastening member toward the seat until one of the protuberances inserts into one of the holes of the holed section and the urging section presses on the base to urge the urging surface against the seat post, and pivoting the bifurcation to press the bar onto the projection will fasten the clamp onto the seat post.

In one aspect of the present invention the flexible member further comprises a confining section between one end and the loop.

The above and other objects, features and advantages of the present invention will become apparent from the following detailed description taken with the accompanying drawings.

DETAILED DESCRIPTION OF THE INVENTION

Figure 1:
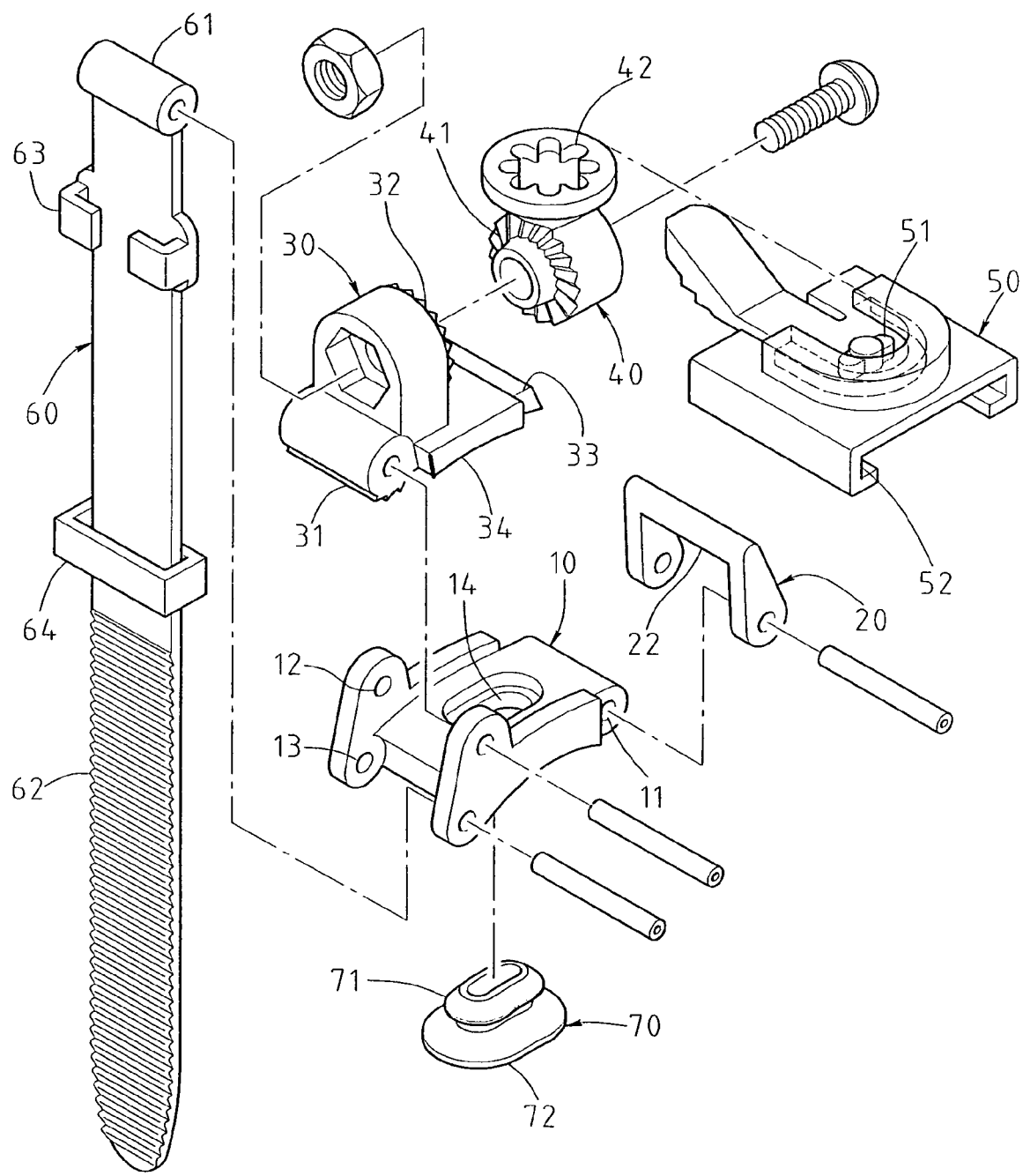
FIG. 1 is an exploded view of a clamp for bicycle seat post according to a first preferred embodiment of the invention.
Figure 2:
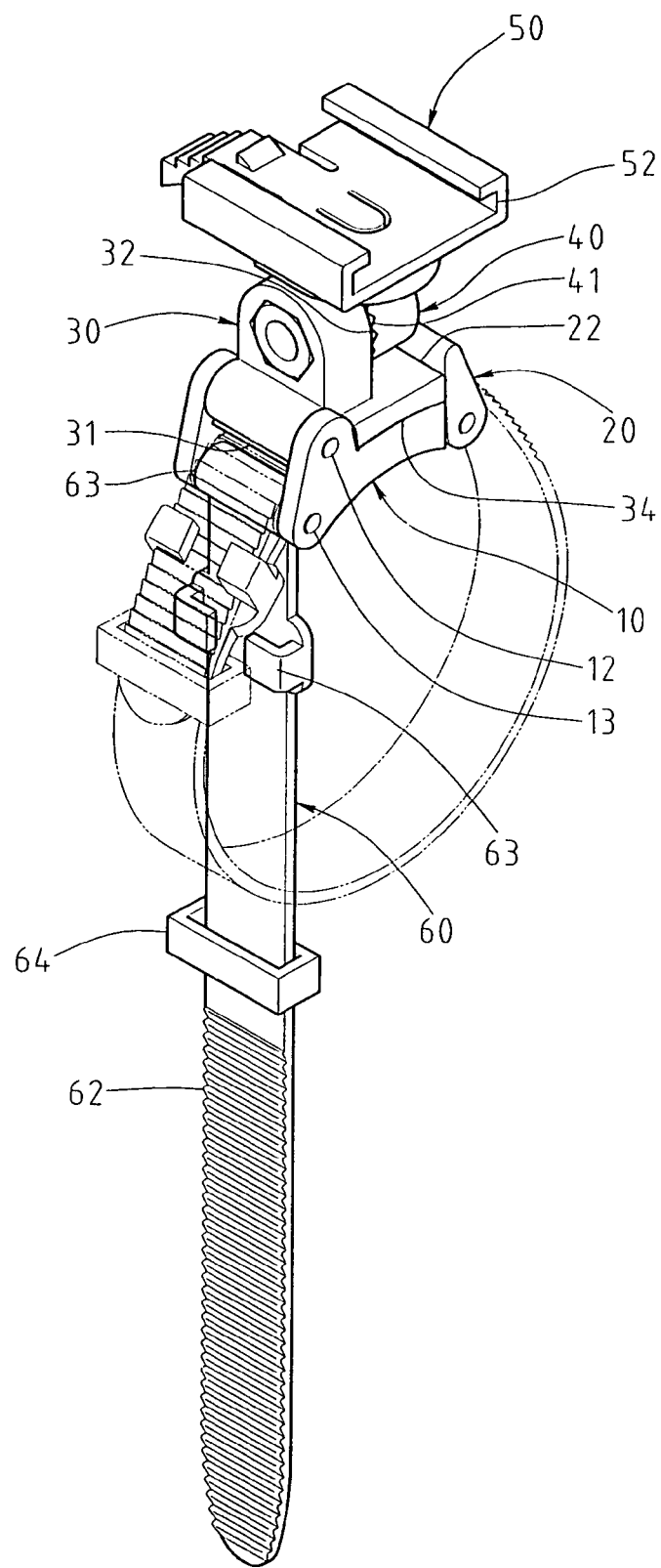
FIG. 2 is a perspective view of the assembled clamp in FIG. 1.
Figure 3:
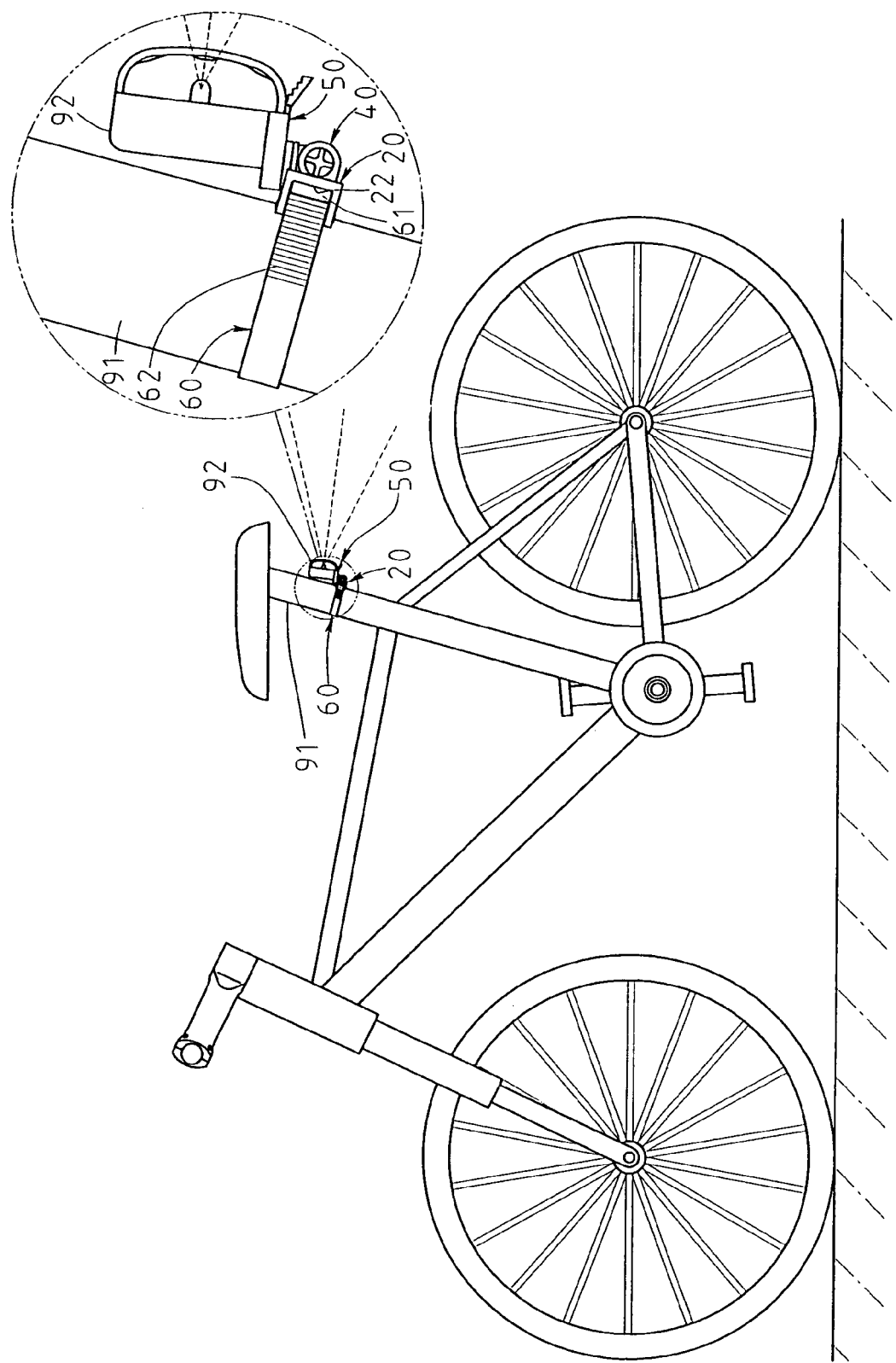
FIG. 3 is a side elevation of a bicycle incorporated the clamp of the invention.
Figure 4:
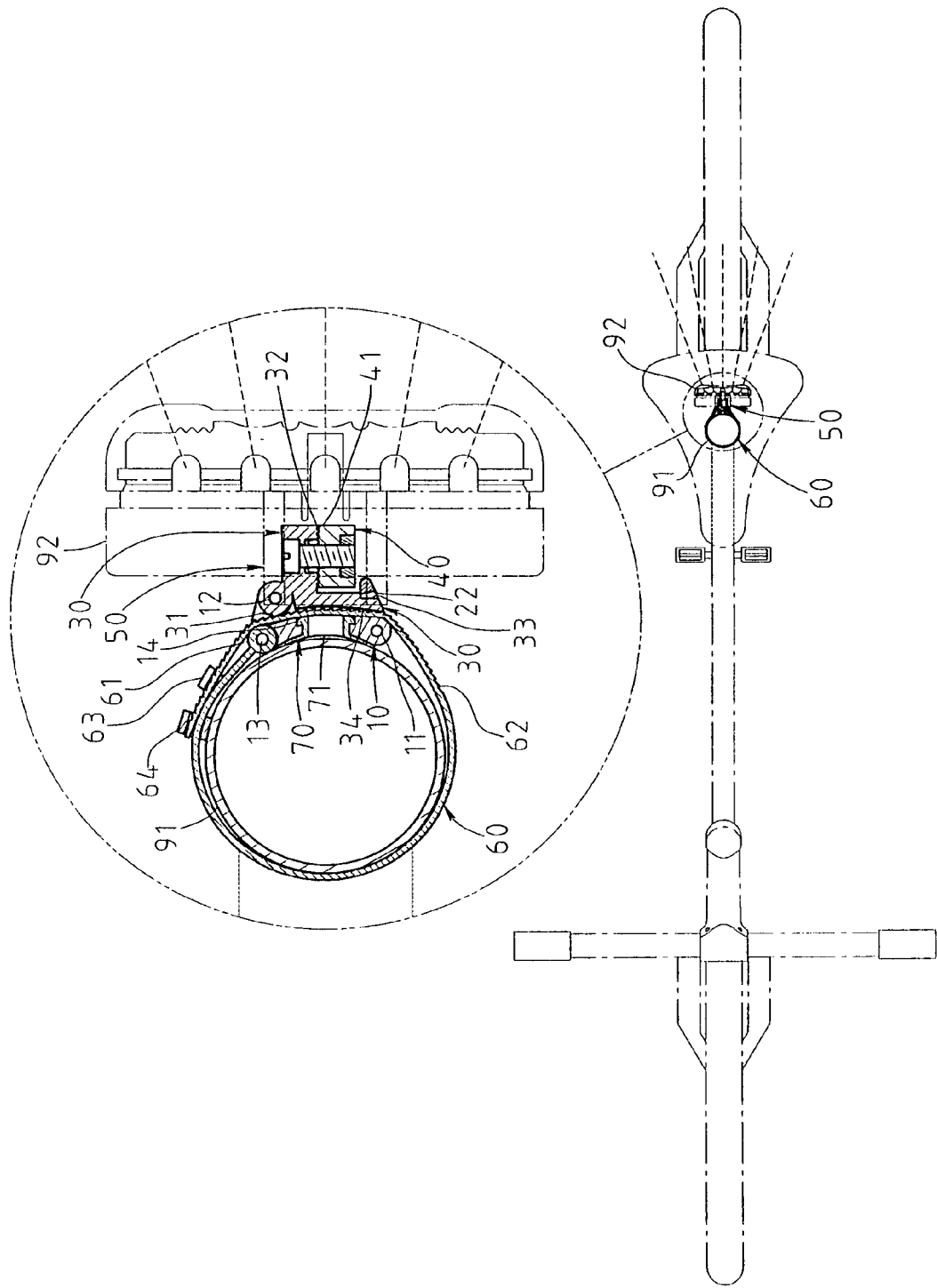
FIG. 4 is a top plan view of FIG. 3.
Figure 5:
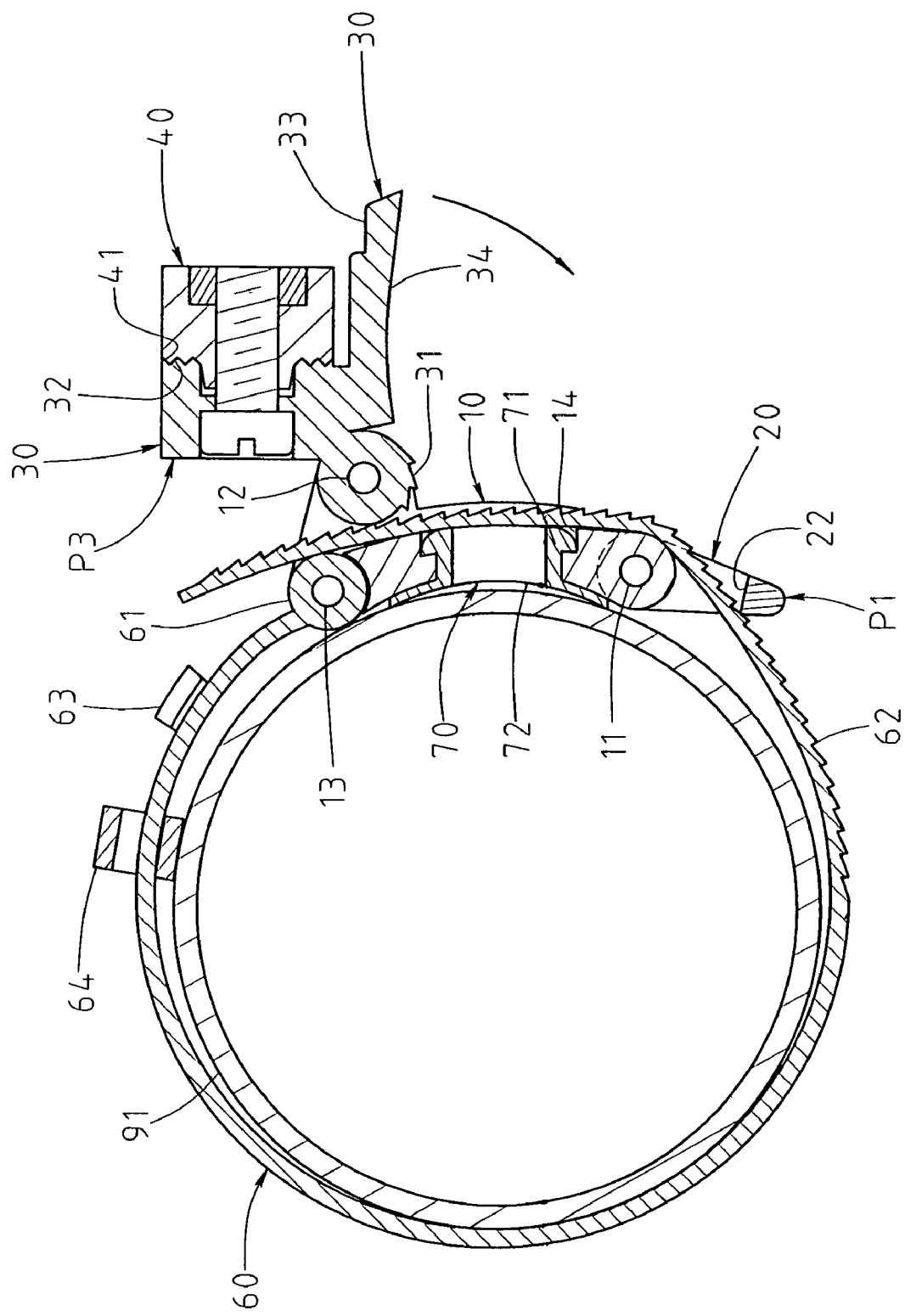
FIGS. 5, 6, and 7 are enlarged sectional views of a portion of a circle in FIG. 4 for illustrating a fastening of the clamp around the seat post.
Figure 6:
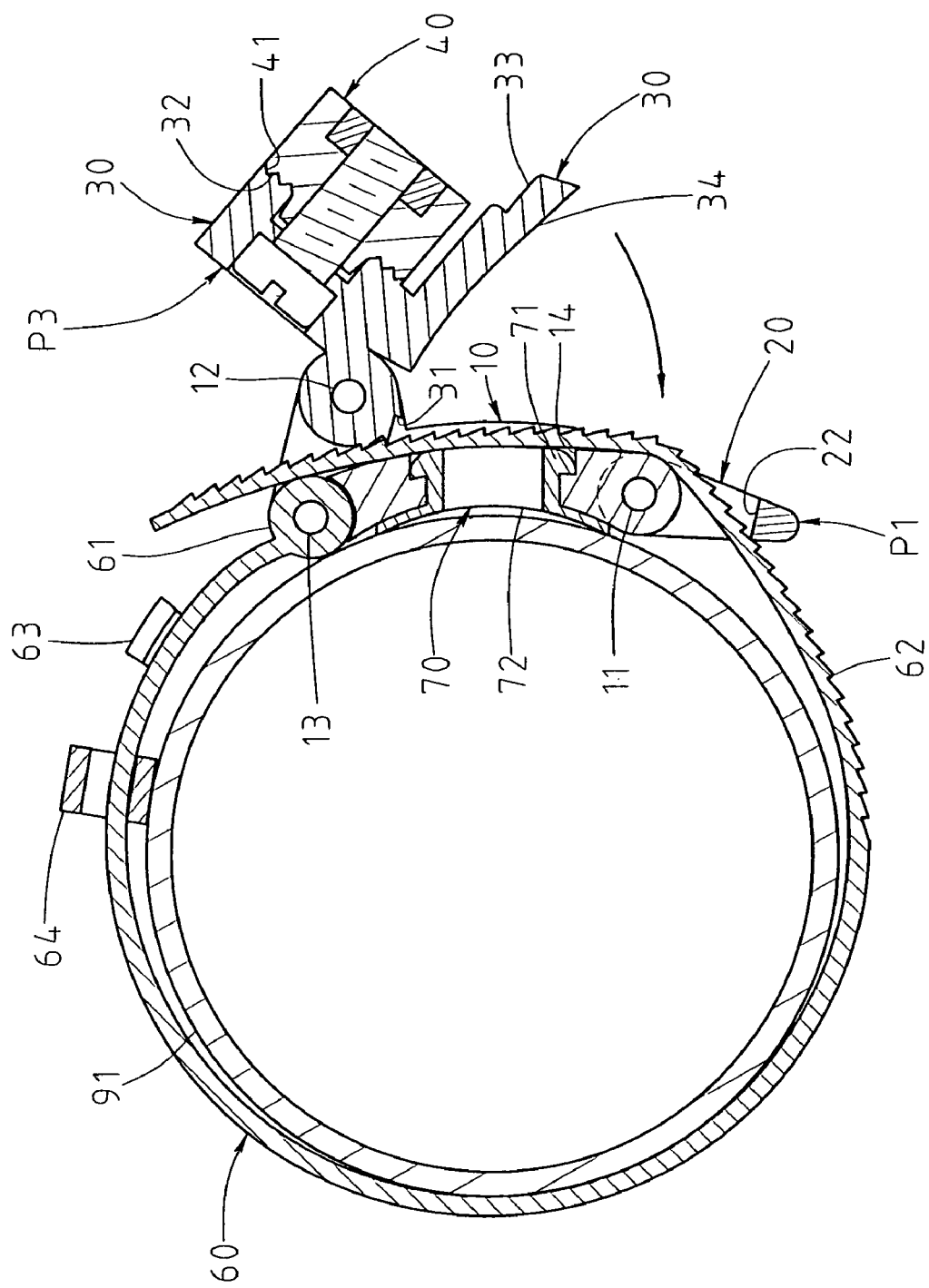
Figure 7:
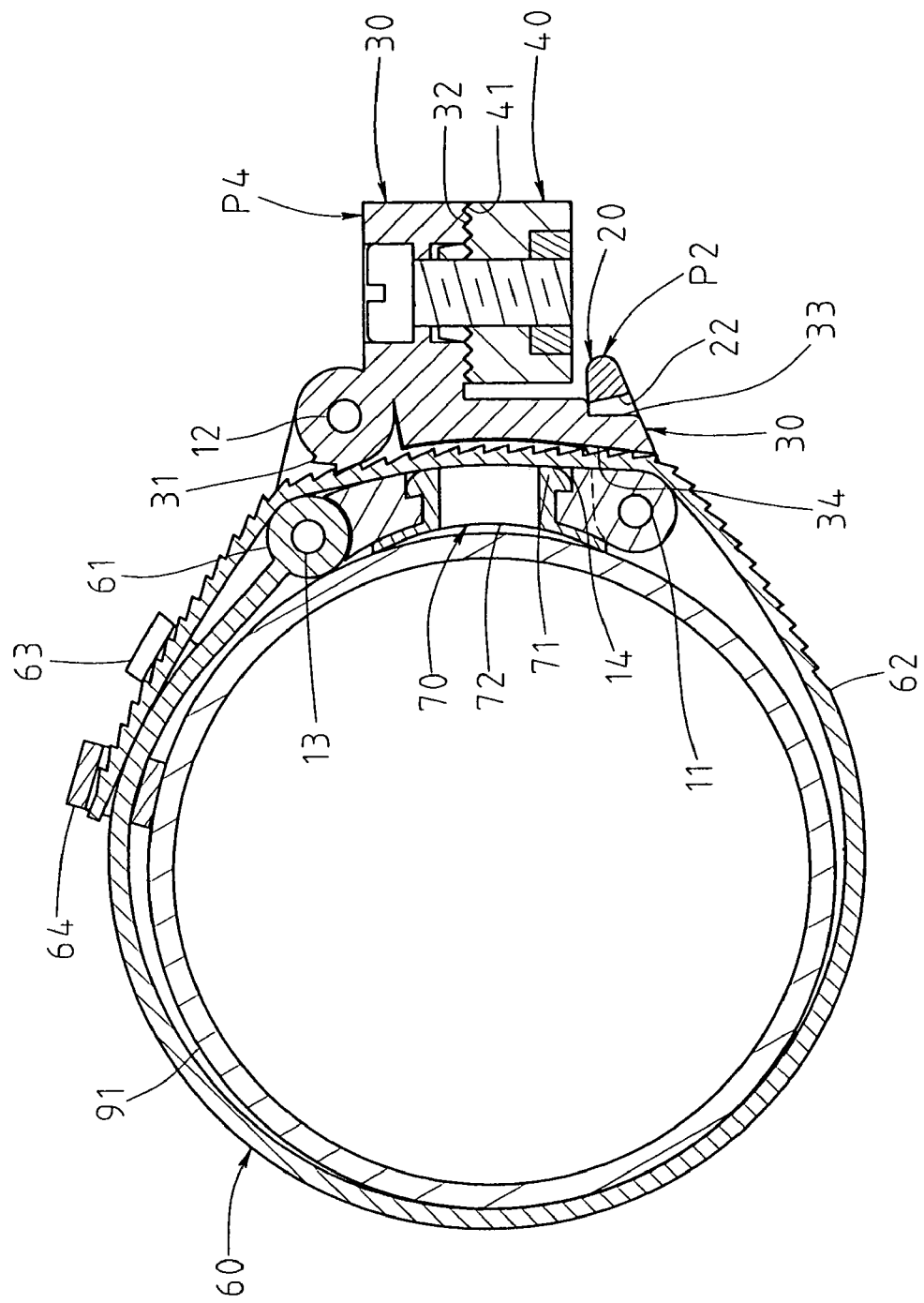

Referring to FIGS. 1 to 8, a bicycle clamp in accordance with a first preferred embodiment of the invention is shown and comprises a base 10, a pivotal bifurcation 20, a fastening member 30, a universal member 40, a seat 50, a flexible member 60, and a urging member 70. Each component is discussed in detailed below.

The elongated, flexible base 10 comprises a pipe-shaped arm 11 at one end, a pair of first through holes 12 at the other end, a pair of second through holes 13 below the first through holes 12, and a staged tunnel 14 through its center. The urging member 70 comprises a neck 71 securely fitted in the tunnel 14, and a urging surface 72.

The bifurcation 20 is pivotably secured to one end of the base 10 by inserting a pin through two opposite holes thereof and the arm 11. The bifurcation 20 comprises a bar 22 interconnected two arms thereof. The fastening member 30 comprises a series of pawls 31 at the other end such that the fastening member 30 is adapted to pivotably secure to an upper portion of one end of the base 10 by inserting a pin through the first through holes 12 and a pipe-shaped portion of the pawls 31. The fastening member 30 further comprises a transverse projection 33 at one end, a urging section 34 formed between the pawls 31 and the projection 33, and a toothed section 32 formed on a member projected from the urging section 34 and being perpendicular thereto.

The universal member 40 comprises a gear 41 at the other end adapted to mesh with the toothed section 32. A bolt is driven through a bore through the gear 41 and a channel through the toothed section 32 to pivotably fasten the universal member 40 and the fastening member 30 together by threadedly engaging with a nut. The universal member 40 further comprises a disc 42 including a hollow center having a plurality of cavities formed around.

The seat 50 comprises an elliptic member 51 on one surface adapted to fit between two opposite cavities of the disc 41 with the disc 41 being fastened in a U-shaped member around the elliptic member 51, and two side groove rails 52 on the opposite surface. The elongate flexible member 60 comprises a pipe-shaped arm 61 at one end such that a pin may be inserted through the second through holes 13 and the arm 61 to pivotably secure the base 10 to the flexible member 60. The flexible member 60 further comprises a confining member 63 adjacent the arm 61, an intermediate loop 64, and a ratchet section 62 extended from a portion proximate the loop 64 to the other open end.

Figure 8:
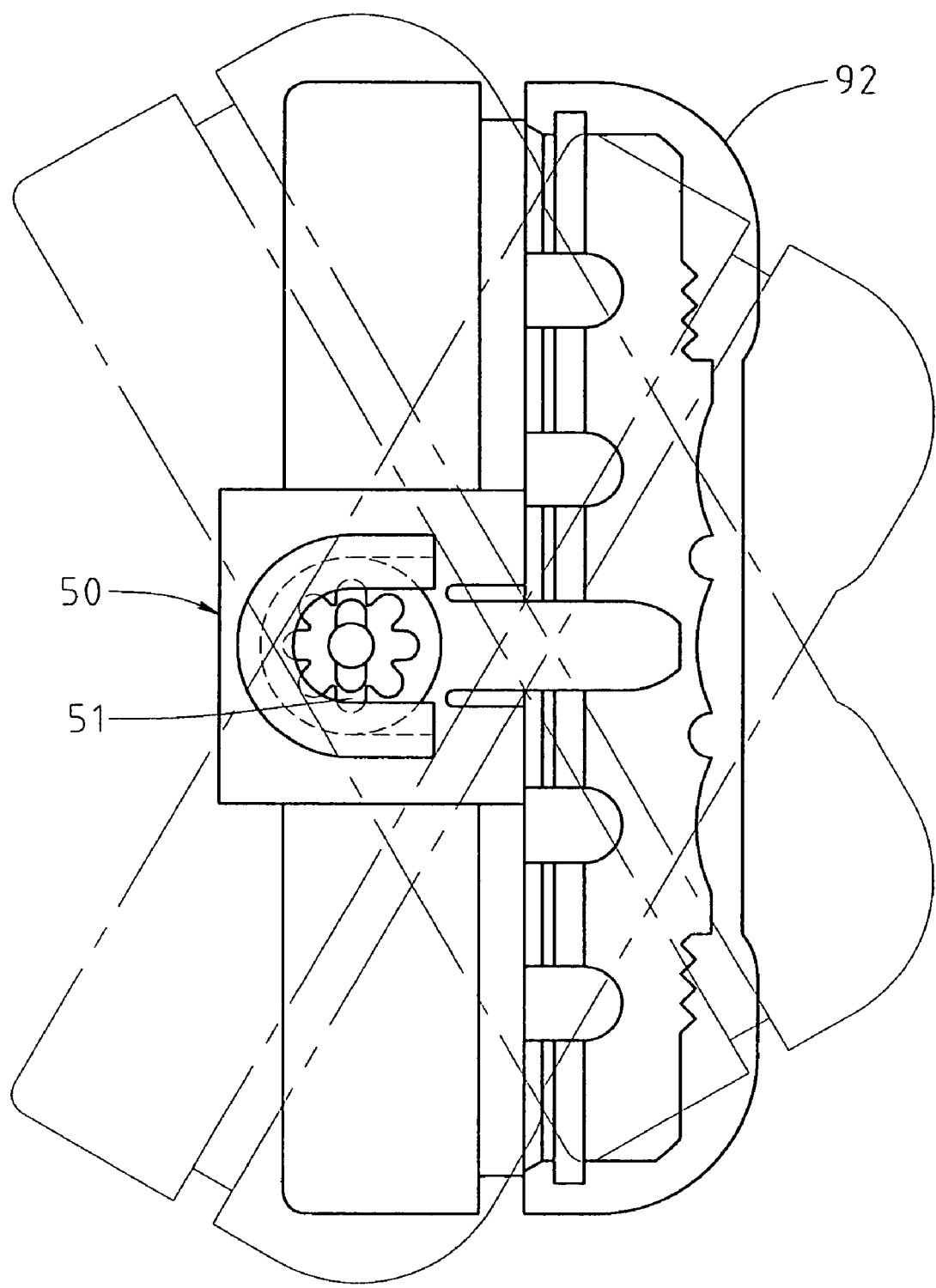
FIG. 8 is a top view showing different positions of a pivotal light mounted on the clamp below a saddle.

An assembly of the invention will be described in detailed below. Wrap the flexible member 60 around a seat post 91 by inserting the flexible member 60 through a channel between the bar 22 of the bifurcation 20 and the arm 11, and a channel between the arm 61 and the pawls 31. The flexible member 60 is again inserted through the confining member 63 and the loop 64 to its maximum. Next, pivot the fastening member 30 toward the seat 10 until one of the pawls 31 catches and holds one of the teeth of the ratchet section 62 and the urging section 34 presses on the base 10 which again presses the urging surface 72 on a surface of the seat post 91. Finally, pivot the bifurcation 20 to press the bar 22 onto the projection 33. At this fastened position, the open end of the flexible member 60 is disposed in the loop 64. Further, a light 92 may be mounted on the rails 52. As shown in FIG. 8, the light 92 may turn about 90 degrees about the disc 42. Furthermore, the universal member 40 may turn about 180 degrees about the fastening member 30 by turning the gear 41 relative to the toothed section 32.

Figure 9:
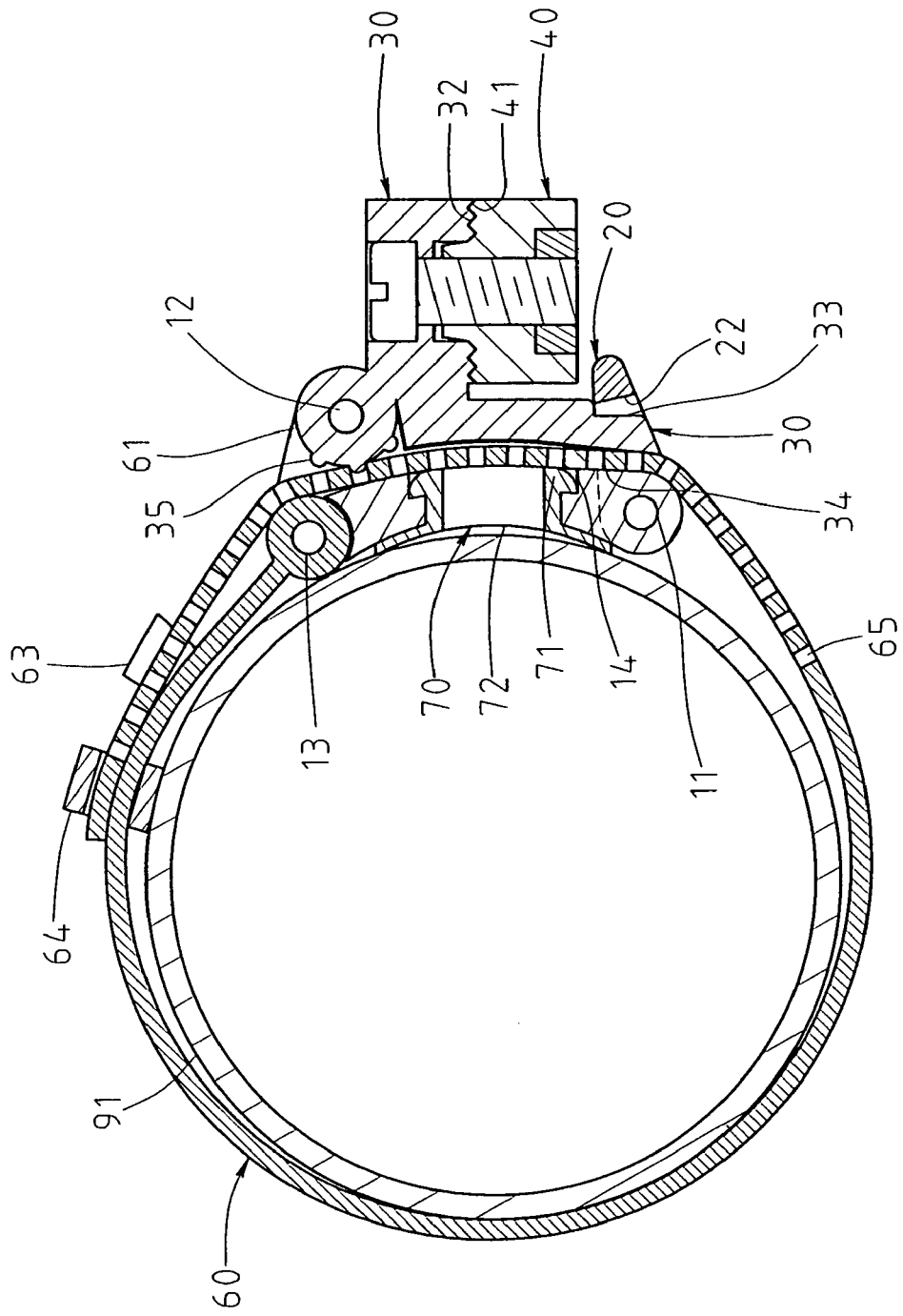
FIG. 9 is a sectional view of a clamp according to a second preferred embodiment of the invention being fastened around the seat post.
Figure 10:
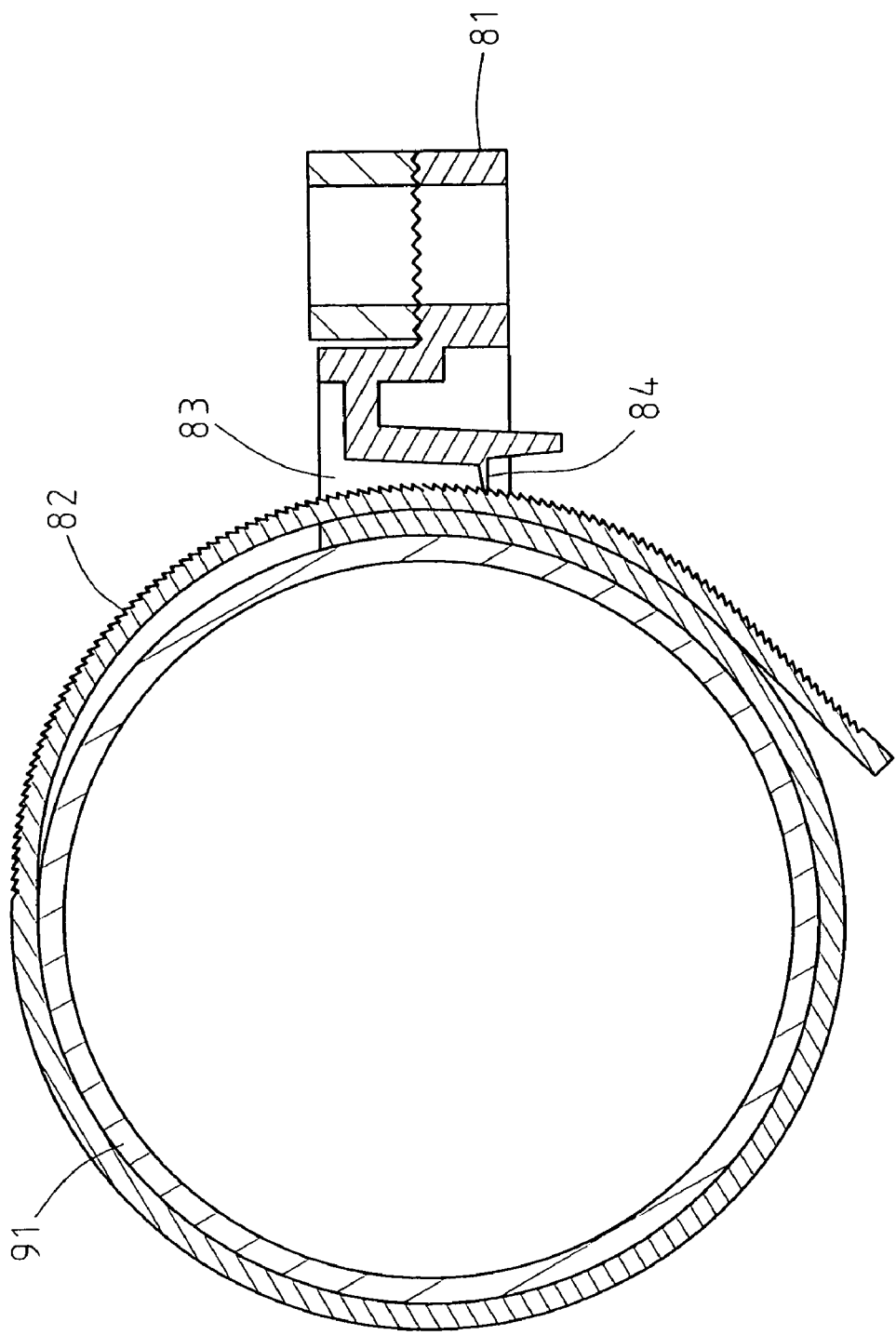
FIG. 10 is a sectional view of a conventional clamp for bicycle seat post.

Referring to FIG. 9, a clamp in accordance with a second preferred embodiment of the invention is shown. The second embodiment is identical to the first embodiment, except that the ratchet section 62 is replaced by a holed section 65 and the pawls 31 are replaced by a series of protuberances 35 respectively. As such, one of the protuberances 35 may be inserted into one of holes of the holed section 65 for securing the clamp to the seat post 91.

While the invention herein disclosed has been described by means of specific embodiments, numerous modifications and variations could be made thereto by those skilled in the art without departing from the scope and spirit of the invention set forth in the claims.

What is claimed is:

1. A clamp comprising:
   a flexible base comprising a first pivot at one end, a second pivot at the other end, a third pivot below the second pivot, and a staged tunnel through its center;
   a urging member comprising a neck securely fitted in the tunnel, and a urging surface;
   a bifurcation pivotably secured to the first pivot and comprising two arms and a bar interconnected the arms thereof;
   a fastening member having the other end pivotably secured to the second pivot and comprising a series of pawls at the other end, a transverse projection at one end, a urging section interconnected the pawls and the projection, a tunnel member projected from the urging section and being perpendicular thereto, and a toothed section formed on the tunnel member;
   a universal member comprising a hollow cylinder secured to the fastening member, a gear formed at the other end of the cylinder and meshed with the toothed section, and a disc projected from an outer surface of the cylinder, the disc including a hollow center having a plurality of cavities formed around;
   a seat comprising a U-shaped member formed on one surface with the disc being fastened therein, an elliptic member formed in the U-shaped member and adapted to fit between any two opposite ones of the cavities, and a mounting member formed on the other opposite surface and adapted to releasably secure to a light; and
   an elongate flexible member having one end pivotably secured to the third pivot and comprising a loop and a ratchet section having a series of teeth extended from a portion proximate the loop to the other open end;
   whereby wrapping the flexible member around a seat post of a bicycle by inserting the flexible member through a space between the bar and the first pivot, a space between the second and third pivots, and the loop, pivoting the fastening member toward the seat until one of the pawls catches and holds one of the teeth of the ratchet section and the urging section presses on the base to urge the urging surface against the seat post, and pivoting the bifurcation to press the bar onto the projection will fasten the clamp onto the seat post.

2. The clamp of claim 1, wherein the flexible member further comprises a confining section between one end and the loop.

3. A clamp comprising:
   a flexible base comprising a first pivot at one end, a second pivot at the other end, a third pivot below the second pivot, and a staged tunnel through its center;
   a urging member comprising a neck securely fitted in the tunnel, and a urging surface;
   a bifurcation pivotably secured to the first pivot and comprising two arms and a bar interconnected the arms thereof;
   a fastening member having the other end pivotably secured to the second pivot and comprising a series of protuberances at the other end, a transverse projection at one end, a urging section interconnected the protuberances and the projection, a tunnel member projected from the urging section and being perpendicular thereto, and a toothed section formed on the tunnel member;
   a universal member comprising a hollow cylinder secured to the fastening member, a gear formed at the other end of the cylinder and meshed with the toothed section, and a disc projected from an outer surface of the cylinder, the disc including a hollow center having a plurality of cavities formed around;

a seat comprising a U-shaped member formed on one surface with the disc being fastened therein, an elliptic member formed in the U-shaped member and adapted to fit between any two opposite ones of the cavities, and a mounting member formed on the other opposite surface and adapted to releasably secure to a light; and an elongate flexible member having one end pivotably secured to the third pivot and comprising a loop and a holed section having a series of holes extended from a portion proximate the loop to the other open end; whereby wrapping the flexible member around a seat post of a bicycle by inserting the flexible member through a space between the bar and the first pivot, a space between the second and third pivots, and the loop, pivoting the fastening member toward the seat until one of the protuberances inserts into one of the holes of the holed section and the urging section presses on the base to urge the urging surface against the seat post, and pivoting the bifurcation to press the bar onto the projection will fasten the clamp onto the seat post.

4. The clamp of claim 3, wherein the flexible member further comprises a confining section between one end and the loop.

* * * * *